Jan. 24, 1961        J. F. CROSFIELD        2,968,988

APPARATUS FOR INDICATING CHANGES IN INK

Filed Sept. 3, 1957                          4 Sheets-Sheet 1

Inventor
John F. Crosfield
By Ralph B. Stewart
Attorney

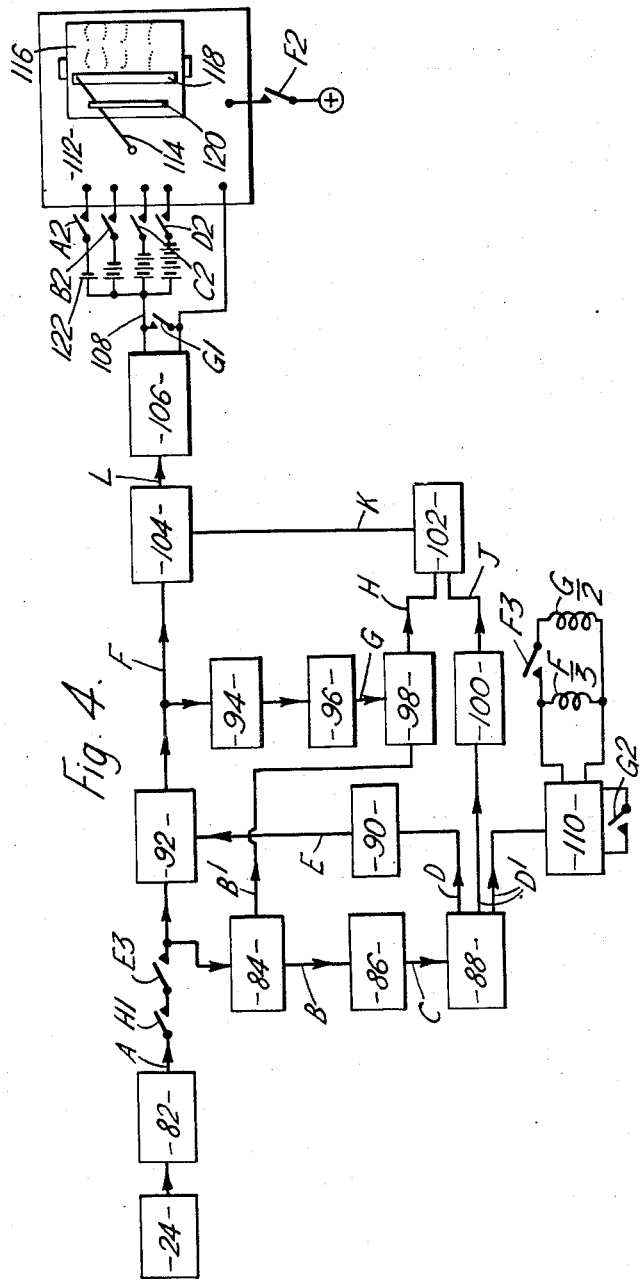

Jan. 24, 1961   J. F. CROSFIELD   2,968,988
APPARATUS FOR INDICATING CHANGES IN INK
Filed Sept. 3, 1957   4 Sheets-Sheet 4
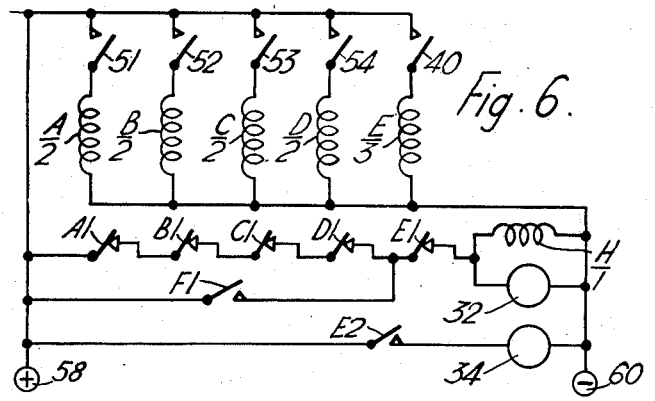
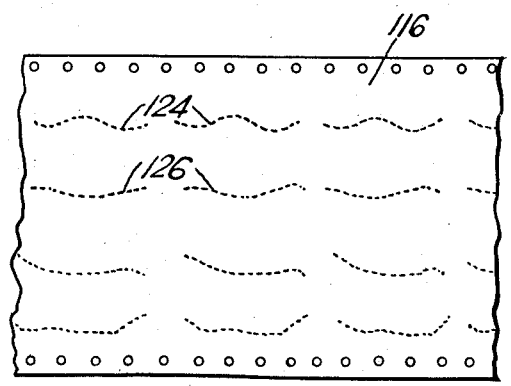
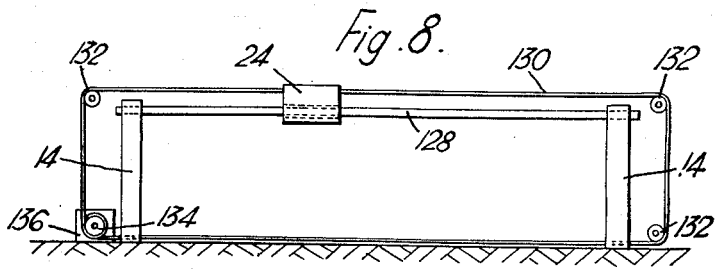
Inventor
John F. Crosfield
By Ralph B. Stewart
Attorney United States Patent Office 2,968,988
Patented Jan. 24, 1961

2,968,988
APPARATUS FOR INDICATING CHANGES IN INK

John Fothergill Crosfield, London, England, assignor to J. F. Crosfield Limited, London, England, a company of Great Britain Filed Sept. 3, 1957, Ser. No. 681,843

Claims priority, application Great Britain Mar. 18, 1955

12 Claims. (Cl. 88—14)

This application is a continuation-in-part of my co-pending United States patent application Serial No. 571,745, filed March 15, 1956, and is for an invention relating to monitoring and control apparatus for use with equipment for ink printing and, in particular, to equipment for multi-colour printing. In such printing, in order to obtain a consistently accurate colour reproduction, it is important to ensure that the thickness or density of the ink film deposited by each successive printing cylinder remains substantially uniform. The present method of checking the consistency of the colour reproduction is for the machine-minder to compare a printed copy with a standard copy known as the "pass copy" at regular intervals of time. In doing this, he has to rely on his eye alone and he has no quantitative knowledge of changes in density in the ink and no means of preventing a change in quality until it is sufficiently noticeable for him to be certain of the change, under very difficult conditions. Therefore, not only is the present method not very accurate but it may also entail loss of production brought about by the necessary rejection of all printed copies whose colour reproduction does not come within certain limits of the "pass copy."

In co-pending application Serial No. 571,745, there is described apparatus for monitoring ink density and, if necessary, the spectral values of the ink tones, in which each printing cylinder is arranged to print a mark consisting of a small patch of colour in such a way that the patches appear along a track on the web being printed and are spaced apart by relatively short intervals; the patches are scanned by a photoelectric scanning head after the printed web has passed the printing cylinder and by measuring the signals picked up by the photocell, the instrument can monitor or indicate the value of reflection density of a given tone printed on some material in the respective colours.

In offset lithography and letterpress printing, it is found necessary to measure the ink density at a number of points across the sheet or web, because the quantity of ink which is transferred to different longitudinal strips of the printing surface may vary from point to point and and can be adjusted separately at different points across the width of the web or sheet. This adjustment may be effected by means of a flexible wiper blade co-operating with the ink roller, the distance of different portions of the wiper blade from the ink roller being separately adjustable.

According to the present invention, the apparatus includes translating means for traversing a photoelectric scanning head across a moving printed surface, transversely to the direction of movement of the latter, whereby the scanning head is enabled to scan monitoring areas in the form of a number of patches of the said ink spaced at selected points across the width of the printed surface, and indicating means responsive to the output of the scanning head to provide an indication of the quality of reproduction of that colour at the selected points.

The apparatus may be used in multicolour printing with printed surfaces on which there are provided monitoring areas, spaced across the width of the printed surface, in the form of a number of patches of ink of each of the colours printed.

A scanning head arranged for traversing movement across a moving printed surface is shown in Figure 13 of application Serial No. 571,745, which also describes and illustrates in Figure 14, taken in combination with Figure 1, apparatus for converting the output of the scanning head into indications of ink quality across the width of the printed surface.

In the preferred embodiment of the present invention, means are provided for stopping the scanning head each time it comes into register with a longitudinal line of colour patches, and it is advantageous to cause the scanning head to remain in each position during the passage of a number of colour patches in this longitudinal line past the scanned area. The colour signals from the scanning head can then be passed to an integrator, the output of which represents the average of the separate signals corresponding to the separate colour patches scanned during the period of rest of the scanning head. This average signal is used to operate the indicating means. With this arrangement greater accuracy is obtained and the difficulties associated with the irregularity of sheet feed systems are greatly reduced. In some conditions, however, where the accuracy required is not so great, the scanning head need scan only a single colour patch before moving transversely to the next longitudinal line of colour patches.

An electronic counter may be employed to count the signals from the scanning head during its period of rest and to cause the scanning head to be set in motion again when the predetermined number of signals has been received.

In the preferred embodiment of the invention the signals from the photoelectric scanning head are amplified and applied to a recording galvanometer. This is arranged to print separate traces for the different colours, each trace consisting of a repeating pattern representing the variation of the ink density for the colour in question across the width of the sheet.

In order that the invention may be better understood, an embodiment thereof will now be described by way of example with reference to the accompanying drawings. Although this description relates to a sheet-feed machine, it is to be understood that the invention can be applied equally well to web-feed machines.

In the drawings:

Figure 4 is a circuit diagram in block schematic form of the apparatus for applying the output of the scanning head to the recorder;

Figure 6 is a circuit diagram showing the switching arrangements for the forward and reverse drive of the scanning head;

Figure 7 shows the form of the colour traces on the chart, and

Figure 8 shows an alternative driving system for the photoelectric scanning head.

Figure 1:
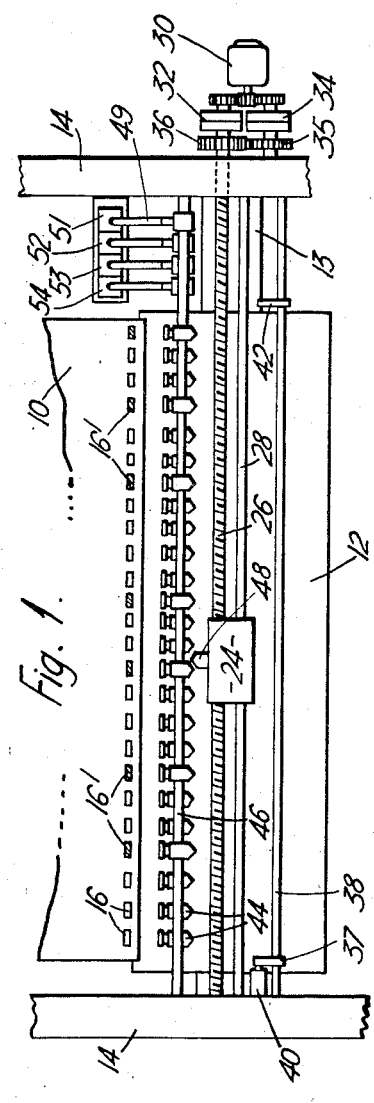
Figures 1 and 2 show diagrammatically in front elevation and in end view respectively, the arrangement of the traversing scanning head and the means for stopping the scanning head during its motion across the sheet.

In the drawings, a printed sheet 10 is about to pass round a drum 12 mounted on a shaft 13 between the side-frames 14 of the press. Across the printed sheet are arranged a number of monitoring areas in the form of patches 16 of ink of the colours used in printing the multi-colour representation on the sheet. In the drawings the cross-hatched patches 16' represent patches of yellow ink, and the remaining patches are of red, blue and black ink, the colour patches being located at the foot of those longitudinal strips on the sheet where it is important to know the quality of the colour in question, usually the strips in which a large quantity of ink of that colour is laid down. As the sheet 10 passes round the rotating drum 12 the line of colour patches passes a photoelectric scanning head 24 mounted on a lead screw 26 and guide bar 28. The lead screw engages with a corresponding thread in the scanning head, so that rotation of the screw causes the scanning head to move from one side of the press to the other. The lead screw is driven by a motor 30, which also drives the press, through a forward magnetic clutch 32 for motion of the scanning head from right to left in Figure 1, and by the same motor 30 through a reverse magnetic clutch 34 and through gear wheels 35 and 36 for motion of the scanning head in the opposite direction. When the scanning head reaches the left-hand end of the press it strikes against a stop lever 37 on a bar 38 and moves the stop member sufficiently to operate a reversing microswitch 40, which disconnects the forward magnetic clutch 32 and brings into operation the reverse magnetic clutch 34. When the scanning head reaches the right-hand end of the press again it strikes against a stop member 42 and moves the bar 38 to the right, thereby restoring the switch 40 to its original condition and bringing the forward magnetic clutch into operation again.

Figure 2:
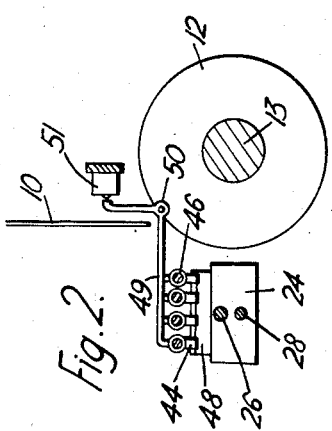

A number of stop members 44 are adjustably mounted on each of four bars 46 and serve to stop the photoelectric scanning head when it comes into register with a longitudinal line of colour patches. There is a bar 46 for each of the colours printed and the stops 44 are arranged along each bar 46 in register with the patches of the corresponding colour on the sheet 10. The bars 46 normally rest at the base of vertical slots formed in the side members 14 of the frame, and when the inclined upper surface of the projection 48 on the scanning head strikes the inclined lower face of one of the stops 44, the associated bar 46 (see also Figure 2), to which is affixed a bell-crank lever 49, is lifted in a rotary movement about a pivot 50, thereby causing the operation of a microswitch 51 by the remote end of the bell-crank lever. As shown in Figure 1 there are four switches 51, 52, 53 and 54, each corresponding to one of the colours to be printed.

Referring now to Figure 6 it will be seen that the switches 51, 52, 53 and 54 are arranged in parallel circuit branches between a positive terminal 58 and a negative terminal 60. The circuit branch containing the yellow switch 51 also contains a relay A/2 and the parallel circuit branches containing the red, blue and black switches 52, 53 and 54 contain the relays B/2, C/2 and D/2, respectively. A fifth parallel branch between the positive and negative terminals contains the reversing switch 40 and a relay E/3.

The contacts A1, B1, C1, D1 and E1 of these five relays are connected in series with the forward magnetic clutch 32 between the positive and negative terminals. Thus, operation of any of the colour switches 51, 52, 53 and 54 causes the disconnection of the forward magnetic clutch, and thus causes the scanning head to be brought to a stop. The closing of the reversing switch 40 also results in the opening of the forward magnetic clutch circuit by means of the contact E1, but at the same time a second contact E2 of the relay E/3 closes the circuit of the reverse magnetic clutch 34 and causes the lead screw 26 to rotate in the opposite direction. As will later be described in detail, a normally-open contact F1 short-circuits the contacts A1, B1, C1 and D1, and enables the restoration of forward drive to the scanning head when the latter has been stopped by the closing of one of the switches 51, 52, 53 and 54.

Figure 3:
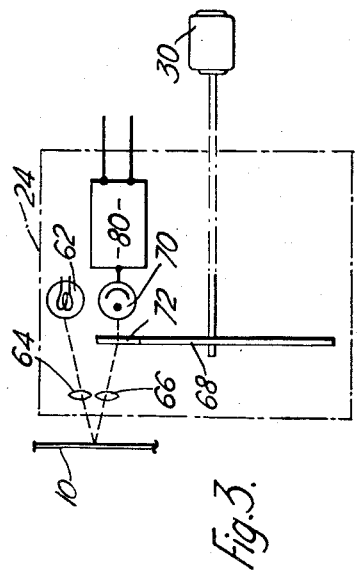
Figure 3 shows diagrammatically the arrangement of parts within the scanning head.

Referring now to Figure 3, the scanning head 24 includes a lamp 62, the filament of which is focused by means of a lens 64 on to a scanning point on the sheet 10. A second lens 66 focuses the image of the lamp filament on to a rotating shutter 68, which prevents light from the lens 66 reaching a photoelectric cell 70 except during the small period in the rotation of the shutter when an aperture 72 passes in front of the photoelectric cell. It is arranged that as each sheet passes the scanning head the aperture 72 exposes the cell to the light for a small period during which one of the ink patches passes the scanning point. The rotating shutter thus serves to prevent the photoelectric cell from measuring the density of the printed picture areas between successive monitoring areas.

To maintain the rotation of the shutter in synchronism with the passage of the sheets past the scanning point, the rotating shutter is driven by the motor 30 which drives the press. This may be effected, for example, by connecting the shaft on which the shutter is mounted to a pinion which engages the lead screw 26 so as to be driven by the rotation of the latter. The scanning head also includes a cathode follower circuit 80 to which the output of the photoelectric cell is applied, the cathode follower serving to match the high impedance of the photoelectric cell to the low impedance of the cable connecting the scanning head to an amplifier 82 (see Figure 4).

The amplifier 82 includes an efficient A.G.C. circuit which operates to maintain its largest output signal at a constant value. The rotating shutter allows light to reach the photoelectric cell during a period slightly greater than that during which the ink patch or monitoring area passes under the filament of the lamp. For a short time, therefore, the white paper is passing under the image of the lamp filament. The largest output signal from the amplifier therefore represents the difference in the light reflected from the paper (which is normally white) on to the photoelectric cell and the light reflected on to the photoelectric cell from the back of the shutter, which is black. The light reflected from the white paper and the light reflected from the back of the shutter constitute two standardising light intensities against which the density of the monitoring areas is measured. The output signals produced when the photocell scans the scanning marks will always be less than the maximum because they will always reflect more light on to the photocell than the back of the shutter will. Hence the scanning marks will not affect the gain of the amplifier. In this way the amplifier automatically compensates for variation in the lamp brightness, photocell sensitivity, for dust on the scanning head glass, and other factors, and produces a signal from each scanning mark proportional only to the light absorbed by that mark.

Figure 5:
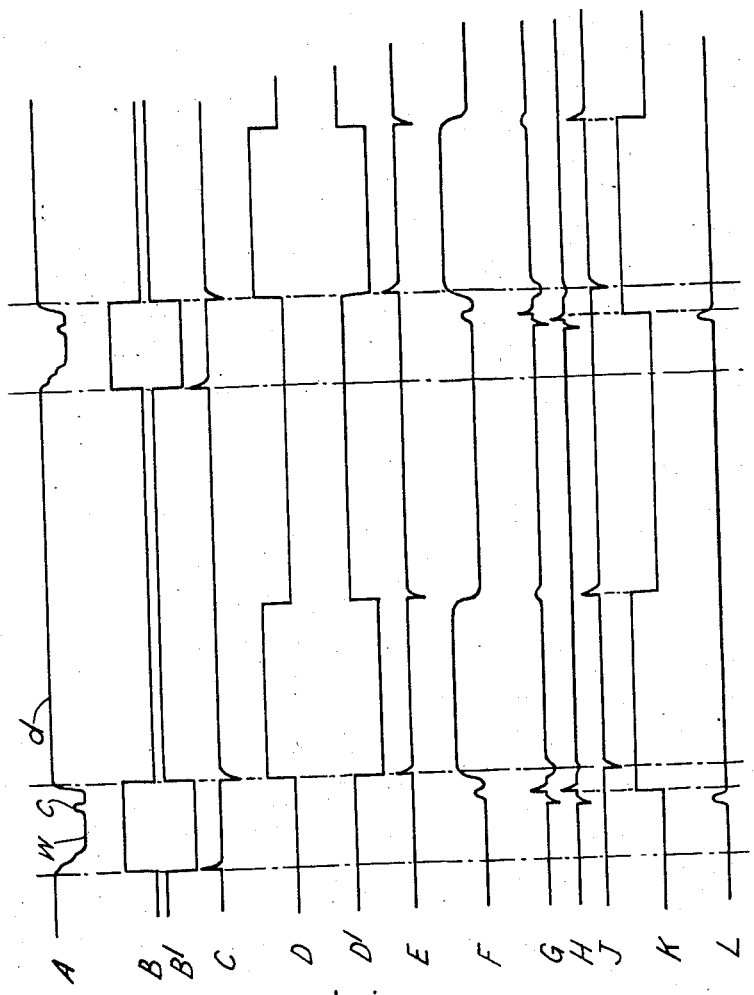
Figure 5 shows the waveforms obtained at various points in the circuit diagram of Figure 4.

The waveform of the output of the A.G.C. amplifier 82 is shown at A in Figure 5, the dark level of the signal being indicated at $d$, the white level at $w$ and the signal corresponding to the colour patch at $c$. This waveform is applied to a Schmitt trigger circuit 84 (Figure 4) which operates at a signal level just below the dark level $d$ and which produces output waveforms B and B' (Figure 5), the waveform B being applied through a differentiating circuit 86 to give an output signal of the form shown at C. The negative pulse of the differentiated signal is used to switch on a monostable multivibrator 88 which returns to its stable condition after a fixed interval of time, for example a quarter of a second. The signals appearing at the anodes of the valves of the multivibrator are shown at D and D'. The signal D is differentiated in a differentiating circuit 90 to produce a waveform E which is applied to a white clamp circuit 92 which also receives the signal A from the A.G.C. amplifier 82. The negative-going pulse of the waveform E serves to clamp the output of the clamp circuit to the earth level, which is then considered as white level, for the remainder of the cycle, as shown by the waveform F. This output signal is then passed through an inverting circuit 94 and a differentiating circuit 96 to produce a signal of the form shown at G in Figure 5, and this is applied to a gate circuit 98 which is operated by the output B′ of the Schmitt trigger circuit. This gate circuit passes the positive- and negative-going pulses corresponding to the beginning and end of the colour patch but removes the positive-going pulse in the signal G which corresponds to the reduction of the signal F to the white level, as is shown at H in Figure 5.

The signal D′ from the multivibrator 88 is passed through a differentiating circuit 100, which provides a waveform J. The output signals from the gate circuit 98 and the differentiating circuit 100 are applied to an Eccles-Jordan trigger circuit 102, the positive-going signal of the waveform J being used to switch on the trigger circuit 102 and the positive-going signal in the waveform H serving to switch it off. The resulting waveform of the output signal of the trigger circuit 102 is shown at K. This waveform is applied as a gating signal to a gate circuit 104 to gate the signal F from the clamp circuit in order to produce an output signal of waveform L which includes only the colour patch signals. This output signal is applied to an additive integrator circuit 106. The integrating circuit 106 serves to add the amplitudes of a selected number of individual colour signals from the gate circuit 104 and to apply to an output conductor 108 a signal representing the average of these pulses. The integrating circuit may take the form of the energy-storage circuit of the linear step kind shown in Figures 17–15 of volume 19 ("Waveforms") of the Radiation Laboratory Series, published by the Massachusetts Institute of Technology.

To determine the number of individual pulses to be added in the integrator, a counter circuit 110 is arranged to receive the signal D′ from the multivibrator 88. This counter may also include an energy-storage circuit of the kind referred to above, the output signal at the cathode of the triode in Figures 17–15 of the above-mentioned publication being applied to a relay-operating triode. The winding of the relay F/3 (Figure 4) operated by this triode is energised in this manner after five sheets, for example, have travelled past the stationary scanning head.

When the reset relay F/2 is energised it closes the contact F1 which short-circuits the series-connected contacts A1, B1, C1 and D1 and brings the forward magnetic clutch 32 into operation once again and enables the scanning head to continue its motion across the sheet. When the member 48 on the scanning head has passed the stop member 44 which caused the scanning head to be brought to a standstill, the corresponding bar 46 resumes its original position and the associated contact A1, B1, C1 or D1 is closed once again.

A second contact F2 of the reset relay F/2 operates to cause a record to be made of the density of the scanned ink patch. The recording system will now be described.

The recorder 112 comprises a galvanometer movement, the needle 114 of which extends over a drum on which is wound a length of record paper 116. Between the end of the needle 114 and the record paper is an ink ribbon 118, which stretches transversely across the drum, and the instrument includes a chopper bar 120 which when operated depresses the needle and brings the portion of the ink ribbon beneath the needle into contact with the record paper. In this way, a record of the position of the needle is made on the drum each time the chopper bar is operated by the closure of the contact F2.

Four parallel circuits extend between the output conductor 108 of the integrator and the input of the galvanometer. These four branches contain contacts A2, B2, C2 and D2 respectively of the four relays A/2, B/2, C/2 and D/2, and each branch also contains a biasing battery 122 supplying a backing-off voltage to the galvanometer when the associated contact is closed, the four batteries supplying voltages of different amplitudes to establish different datum readings for the four colours. Thus, when the scanning head strikes one of the stop members 44 on the front bar 46 of Figure 1 and closes the corresponding switch 51, the operation of the relay A/2 will cause the contact A2 to close and the output of the integrating circuit will be applied to the galvanometer. At the same time the galvanometer movement will be biased by the battery 122 in series with the contact A2. Its resultant position will therefore be dependent on the algebraic sum of the bias and the output of the integrating circuit.

When the reset relay operates, showing that the required number of ink patches have passed the scanning head, the contact F2 closes, causing the energisation of a solenoid (not shown) associated with the chopper bar 120. The chopper bar is then brought down on to the needle 114 and a record of the output of the integrator is thus made on the record paper 116. As the four biasing batteries 122 are of different voltages, the four colour traces on the record paper 116 will be in different positions across the width of the paper. As there are a number of colour patches of each colour across the width of each sheet, a number of record marks will be made on the paper 116 for each colour during the passage of the scanning head from one end of the lead screw to the other. Thus, each colour trace on the record paper will consist of a recurring series of record marks, each series representing the variation of the density of the colour in question across the width of the sheet.

A third contact F3 of the reset relay completes the circuit of a slugged relay G/2 which operates after a suitable delay during which the recording is completed. The contact G1 short-circuits the output of the integrator circuit 106 and thus clears this circuit in readiness for the next series of pulses, and the contact G2 operates in a similar manner to clear the counter 110.

To prevent false signals being applied to the integrator and counter during forward movement of the scanning head, the winding of a relay H/1 is connected in parallel with the forward magnetic clutch. This relay has a single contact H1 in series with a third contact E3 of the reversing relay E/3 between the A.G.C. amplifier and the succeeding circuits. Thus, no signals can be applied to the integrator and counter circuits during the forward or reverse movement of the scanning head, or in other words, the integrator and counter circuits operate only when the scanning head is at rest.

The appearance of the record chart 116 is shown diagrammatically in Figure 7. Each of the traces 124 represents the variation of the yellow ink density across the sheet, each of the traces 126 represent the variation of the red ink density across the sheet, and so on.

Figure 8 shows an alternative method of driving the scanning head in which the scanning head 24 is arranged for sliding motion on a bar 128, the ends of which are supported by the side frames 14 of the press. A cable 130 has its two ends attached to opposite sides of the scanning head 24 and passes round three idle pulleys 132 and a driven pulley 134. The pulley 134 is driven by a geared reversible induction motor 136 which is operated by a three-phase contactor controlled by the switching circuits previously described. In this embodiment the arrangement of the stops 44 remains as shown in Figure 1. The shutter within the scanning head 24 may be driven by a separate shaft connected to the press drive motor or may be driven from the latter by a synchro connection.

Instead of stopping in register with each of the longitudinal lines of monitoring areas, the scanning head can be given continuous transverse movement. This continuous movement may be at a speed such that several monitoring areas in a single longitudinal line pass the scanning area while the scanning head is in register with part or all of this longitudinal line. With such an arrangement the individual pulses from the scanning head corresponding to the passage of the monitoring areas in a single longitudinal line are averaged as described in connection with Figures 4 and 5. In multi-colour printing the movement of the scanning head is arranged to operate switches to send the corresponding colour signals to the correct recording or indicating channel, and also to prevent the application of signals to the integrating and counting circuits during movement of the scanning head between the said longitudinal lines.

The recording system shown diagrammatically in Figure 4 may be replaced by other suitable indicating or recording systems, for example a cathode ray tube of which one pair of deflection plates is provided with a voltage proportional to the distance of the scanning head from one side of the press, and the other pair of deflection plates receives the output of the integrator circuit. A further alternative indicating system includes a group of astatic meters, a line of meters being provided for each of the printed colours, each meter in a line indicating the ink density of one of the longitudinal lines of monitoring areas of the corresponding colour.

I claim:

1. Apparatus for indicating changes in the density of ink on a printed surface, the printed surface having predetermined monitoring areas of ink spaced at selected points across its width, the apparatus comprising a scanning head including a photoelectric cell, driving means for traversing the scanning head across the printed surface to enable the scanning head to scan said monitoring areas and to produce correspondnig electric signals, exposure control means for additionally exposing said photoelectric cell to two different standardising light intensities of greater and less value respectively than those of the monitoring areas, so that the ouput of the photoelectric cell includes, in addition to the signal corresponding to a scanned monitoring area, two signals of different values representing the two different standardising light intensities, a control circuit responsive to the output of the photoelectric cell to provide a signal representing the density of the scanned monitoring area in relation to the standardising light intensities, an indicating means responsive to the density-representing signals to provide an indication of the ink density at the selected points, and gating means rendered operative during movement of the scanning means between the monitoring areas across the width of the printed surface to block the application to the indicating means of data representing the appearance of the printed surface between successively scanned monitoring areas.

2. Apparatus for indicating changes in the density of ink on a moving printed surface, the printed surface having predetermined monitoring areas of ink spaced at selected points across its width, the apparatus comprising a scanning head including a photoelectric cell, driving means for traversing the scanning head across the printed surface, means adjustably positioned in accordance with the positions of the monitoring areas across the width of the printed surface for stopping said scanning head at selected positions, corresponding to the positions of said monitoring areas, whereby said photoelectric cell provides electric signals representing the ink densites of monitoring areas which pass under said scanning head, exposure control means for additionally exposing said photoelectric cell to two different standardising light intensities, of greater and less value respectively than those of the monitoring areas, so that the output of the photoelectric cell includes in addition to the signal corresponding to a scanned monitoring area two signals of different values representing the two different standardising light intensities, a control circuit responsive to the output of the photoelectric cell to provide an electric signal representing the density of the scanned monitoring area in relation to the standardising light intensities, an indicating means responsive to the density-representing electric signals to provide an indication of the ink density at the selected points, and blocking means operating in synchronism with the passage of monitoring areas along the length of the printed surface under the scanning head, to block the application to the indicating means of data representing the appearance of the printed surface between successively scanned monitoring areas.

3. Apparatus according to claim 2, in which said blocking means is constituted by a rotary shutter having formed therein an aperture, the shutter rotating between the photoelectric cell and the printed surface and being driven in synchronism with the movement of the printed surface.

4. Apparatus according to claim 3, in which said rotary shutter also constitutes said exposure control means, the light reflected from the side of the shutter adjacent the photoelectric cell constituting one of the standardising light intensities.

5. Apparatus according to claim 2, in which said stopping means comprises a movable bar, a plurality of adjustable stop members adjustably mounted on the bar and adapted to be struck by the scanning head during its travel across the width of the printed surfaces, said apparatus further comprising a switch in the circuit of said scanning-head driving means which is operated to stop said scanning head as a result of movement of said bar when struck by the scanning head.

6. Apparatus according to claim 2, in which said scanning head stops in each position for a period corresponding to the passage of several monitoring areas, the apparatus including integrating means for adding the output signals from the scanning head to provide a signal representing the average color density of several monitoring areas scanned successively by said stationary scanning head.

7. Apparatus according to claim 6, including an electric counting device means for applying signals from said scanning head corresponding to the passage of monitoring areas to said counting device and means operated by said electric counting device for restoring the drive to said scanning head after the reception of a predetermined number of signals.

8. Apparatus according to claim 7, including switching means operated by said counting device for clearing the output circuits of said integrating means after the reception of said predetermined number of signals.

9. Apparatus according to claim 2, further comprising a reversing switch operated by said scanning head at the end of its travel in one direction for reversing the direction of movement of said scanning head across the printed surface, and switching means operated by the scanning head for preventing the application of signals to said indicating means during the reverse travel of said scanning head.

10. Apparatus according to claim 2, in which the scanning head is driven by a reversible electric motor through a cable and pulley system.

11. Apparatus for indicating changes in the ink density on a surface printed with ink of at least two colors, the printed surface having a plurality of monitoring areas of ink of each of the colors, the said areas being spaced at selected points across the width of the printed surface, the apparatus comprising a scanning head including a photoelectric cell, driving means for traversing the scanning head across the width of the printed surface, whereby the scanning head is enabled to scan said monitoring areas and to produce corresponding electric signals, exposure control means for additionally exposing said photoelectric cell to two different standardising light intensities of greater or less intensity than those of the printed areas, so that the output of the photoelectric cell includes in addition to the signal corresponding to a scanned monitoring area two signals of different values representing the two different standardising light intensities, a control circuit responsive to the output of the photoelectric cell to provide a signal representing the density of the scanned monitoring area in relation to the standardising light intensities, an indicating system which includes separate signal channels for signals representing different colors, whereby separate indications of the density at the selected points are provided for the different colors, switching means for routing said density-representing signals from said control circuit to the different channels, and means for operating said switching means controlled in accordance with the movement of the scanning head, whereby said signals are applied to channels corresponding to the color of the monitoring area which is in register with said scanning head control members positioned in accordance with the transverse positions of the monitoring areas on the printed surface and blocking means operating in accordance with the position of the scanning head relative to said control members to block the application of data to the indicating means when the transverse position of the scanning head is such that it is between monitoring areas.

12. Apparatus according to claim 11, in which said indicating system includes recording means providing separate records for each color, each record showing the variation of the color quality across the width of the sheet, said recording means including a recording galvanometer means for operating the recording means to make a recording at selected instants and means for biasing said recording galvanometer to different datum positions for the different colors.

References Cited in the file of this patent
UNITED STATES PATENTS

| | | |
|---|---|---|
| 1,917,379 | Lowry | July 11, 1933 |
| 2,111,068 | Huebner | Mar. 15, 1938 |
| 2,499,039 | Simmon | Feb. 28, 1950 |
| 2,686,894 | Mathieu | Aug. 17, 1954 |